United States Patent
Ramamurthy et al.

(10) Patent No.: US 9,689,726 B2
(45) Date of Patent: Jun. 27, 2017

(54) FLOW METER

(71) Applicant: Texas Instruments Incorporated, Dallas, TX (US)

(72) Inventors: Venkata Ramanan Ramamurthy, Bangalore (IN); Anand Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 765 days.

(21) Appl. No.: 13/928,562

(22) Filed: Jun. 27, 2013

(65) Prior Publication Data

US 2014/0012518 A1  Jan. 9, 2014

Related U.S. Application Data

(60) Provisional application No. 61/669,445, filed on Jul. 9, 2012.

(51) Int. Cl.
 G01F 1/00 (2006.01)
 G01F 7/00 (2006.01)
 G01F 1/66 (2006.01)
 G06F 17/15 (2006.01)

(52) U.S. Cl.
 CPC ............ G01F 1/66 (2013.01); G01F 1/668 (2013.01); G06F 17/15 (2013.01)

(58) Field of Classification Search
 CPC . G01F 1/66; G01F 1/668; G01F 1/667; G01F 1/666; G06F 17/15
 USPC .................................................. 702/48, 45
 See application file for complete search history.

(56) References Cited

U.S. PATENT DOCUMENTS

| | | | | |
|---|---|---|---|---|
| 2002/0143479 A1* | 10/2002 | Fukuhara | ............... | G01F 1/667 702/45 |
| 2005/0080334 A1* | 4/2005 | Willis | ................... | A61B 19/52 600/424 |
| 2005/0288873 A1* | 12/2005 | Urdaneta | ................. | G01F 1/66 137/487.5 |
| 2009/0276167 A1* | 11/2009 | Glaser | ................... | A61B 5/087 702/48 |
| 2011/0009745 A1* | 1/2011 | Seifer | ....................... | G01F 1/74 600/437 |
| 2011/0037849 A1* | 2/2011 | Niclass | ................ | G01S 7/4814 348/135 |
| 2011/0208038 A1* | 8/2011 | Konofagou | ............. | A61B 8/08 600/410 |

(Continued)

OTHER PUBLICATIONS

Marioli et al., "Digital Time-of-Flight Measurement for Ultrasonic Sensors", Trans. on Instrumentation and Measurement, vol. 41, No. 1 (IEEE, 1992), pp. 93-97.

(Continued)

*Primary Examiner* — Gregory J Toatley
*Assistant Examiner* — Eman Alkafawi
(74) *Attorney, Agent, or Firm* — John R. Pessetto; Charles A. Brill; Frank D. Cimino

(57) ABSTRACT

A flow meter ultrasonically measures fluid velocity in a pipe. Ultrasonic signals received by ultrasonic transducers are digitized. The difference between two ultrasonic propagation times is determined by computing a discrete cross-correlation of the digitized received signals. Computation time is reduced by computing only a few cross-correlation values near a peak cross-correlation value.

16 Claims, 4 Drawing Sheets

(56) References Cited

U.S. PATENT DOCUMENTS

2011/0242939 A1* 10/2011 Pederson ............... G01S 7/527
       367/89
2012/0055239 A1* 3/2012 Sinha ................... G01N 29/024
       73/61.79

OTHER PUBLICATIONS

Wiens et al., "A Comparison of Time Delay Estimation Methods for Periodic Signals", Technical Report (University of Auckland, New Zealand, 2009).

* cited by examiner

FLOW METER

This application claims the benefit of U.S. Provisional Application No. 61/669,445 filed Jul. 9, 2012, which is hereby incorporated by reference.

BACKGROUND

One known technology for measuring fluid velocity is ultrasound. Ultrasound velocity meters may be attached externally to pipes, or ultrasound transducers may be placed internal to pipes. Fluid flow may be measured by multiplying fluid velocity by the interior area of a pipe. Cumulative fluid volume may be measured by integrating fluid flow over time.

FIG. 1 illustrates an example of positioning ultrasonic transducers for fluid velocity measurement. There are many alternative configurations, and FIG. 1 is just an example for the purpose of illustrating some basic equations for ultrasound measurement of fluid velocity. In FIG. 1, two ultrasonic transducers $UT_1$ and $UT_2$ are mounted inside a pipe 100 and a fluid is flowing in the pipe 100. Let L be the distance between the ultrasonic transducers $UT_1$ and $UT_2$. Let $\theta$ be the angle between a line connecting the transducers and the wall of the pipe. Let $t_{12}$ be the propagation time (also known as time-of-flight) for an ultrasonic signal from ultrasonic transducer $UT_1$ to ultrasonic transducer $UT_2$, and let $t_{21}$ be the propagation time for an ultrasonic signal from ultrasonic transducer $UT_2$ to ultrasonic transducer $UT_1$. Let c be the velocity of ultrasound in the fluid, and let v be the velocity of fluid flow. The propagation times are as follows.

$$t_{12} = \frac{L}{c + v[\cos(\theta)]}$$

$$t_{21} = \frac{L}{c - v[\cos(\theta)]}$$

Typically, the angle $\theta$ and the distance L are known and the objective is measure the velocity v of the fluid. If the velocity c of ultrasound in the fluid is known, then only one propagation time ($t_{12}$ or $t_{21}$) is needed. However, the velocity c of ultrasound in the fluid is a function of temperature, and a temperature sensor may or may not be included depending on the target cost of the system. In addition, a flow meter may be used for multiple different fluids (for example, water or gas). Measuring two different propagation times ($t_{12}$ and $t_{21}$) enables elimination of the variable c. Combining the above equations and eliminating the variable c yields the following equation for fluid velocity v.

$$v = \frac{L}{2} * \frac{t_{21} - t_{12}}{t_{21} t_{12}}$$

Therefore, to determine fluid velocity without knowing the velocity of ultrasound in the fluid, measurements of two ultrasonic propagation times ($t_{12}$ and $t_{21}$) are needed. There is an ongoing need for improved measurement of ultrasonic propagation times.

DETAILED DESCRIPTION

Figure 1:
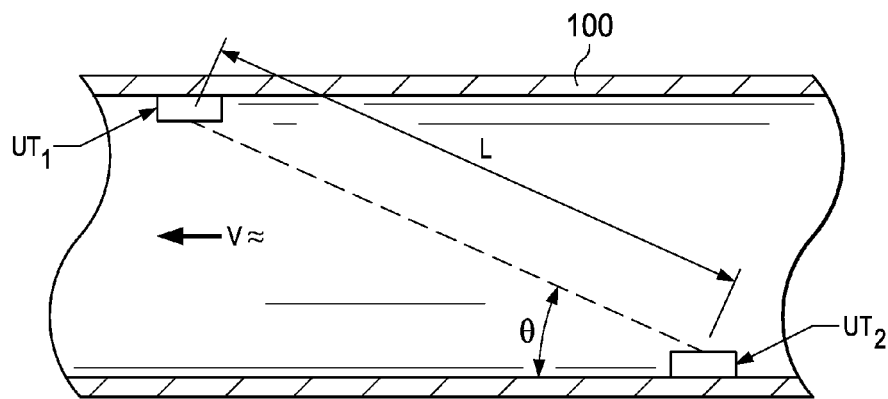
FIG. 1 is a block diagram illustrating an example prior art embodiment of a pipe with ultrasonic transducers for fluid velocity measurement.

As discussed above, one method for measuring fluid velocity is to measure the propagation time of a signal (ultrasonic pressure wave) from an ultrasonic transmitter to an ultrasonic receiver. Two ultrasonic transducers may alternate roles as transmitter and receiver. Flowing fluid in the pipe will cause the down-stream propagation time to be slightly different than the up-stream propagation time, and that slight difference may be used to measure the velocity of the fluid.

If the velocity of ultrasound in the fluid is not known, then two propagation times ($t_{12}$, $t_{21}$) and the differential propagation time ($t_{21}-t_{12}$) are needed. For a flow meter, measurement accuracy is important. For an ultrasonic water meter, the propagation times $t_{12}$ and $t_{21}$ may be on the order of tens of microseconds. However, for low flow rates, the differential propagation time ($t_{21}-t_{12}$) may be on the order of a few nanoseconds. Assume, for example, that fluid velocity needs to be measured with 1% accuracy. The accuracy of the differential propagation time ($t_{21}-t_{12}$) then needs to be on the order of tens of picoseconds. If propagation times $t_{12}$ and $t_{21}$ are measured with 1% accuracy, and if differential propagation time is measured by subtracting $t_{12}$ from $t_{21}$, then the measurement uncertainty may be hundreds of times greater than the quantity being measured and the measurement uncertainty may be tens of thousands of times greater than the required accuracy for the quantity being measured. Conversely, if 1% accuracy is needed for the differential propagation time ($t_{21}-t_{12}$), then simply subtracting a measurement of $t_{12}$ from a measurement of $t_{21}$ to compute the differential propagation time would require extraordinary measurement accuracy of $t_{12}$ and $t_{21}$. In the following discussion, the two individual propagation times ($t_{12}$, $t_{21}$) may be measured with any one of multiple alternative techniques that provide suitable accuracy for the two individual propagation times, and the differential propagation time ($t_{21}-t_{12}$) is measured separately with a technique that provides suitable accuracy for the differential propagation time.

In the following discussion, cross-correlation is used to measure the differential propagation time ($t_{21}-t_{12}$). Two received signals are digitized by an analog-to-digital converter (ADC) and a discrete cross-correlation is computed. The discrete cross-correlation measures how much one received signal is shifted relative to the other received signal.

Let $r_1^i$ be the ith sample of the signal received by ultrasonic transducer $UT_1$ and let $r_2^i$ be the ith sample of the signal received by ultrasonic transducer $UT_2$. Each digitized received signal starts at the time of the corresponding transmitted signal. That is, the time of signal transmission is known, but the transmitted signal does not need to be digitized. Let k be an integral number of sample time periods. The cross-correlation of the two sampled signals is computed as follows:

$$\text{corr}(k) = \sum_{i=1}^{N}(r_1^{i+k})(r_2^k) \text{ for } k = \{-m, -(m-1), \ldots, (m-1), m\}$$

The variable k may be envisioned as a discrete delay or shift in time in sample time periods. That is, the cross-correlation summation is repeated as the received signals are shifted in time by k sample periods. Let k' be the value of k that results in the maximum cross-correlation summation. An estimate of the differential propagation time $(t_{21} - t_{12})$ is:

$$t_{21} - t_{12} \sim (\text{sample period}) * k'$$

Flow meters may be battery operated and may be located in areas where it is inconvenient or impractical to frequently change batteries. Some installations require a battery life on the order of 20 years. Accordingly, it is important to reduce the amount of processing required for cross-correlation to reduce the power consumed by the controller. In the above equation for discrete cross-correlation, the number of samples (N) may be on the order of 100 samples, and if the time shift is being measured is unknown then cross-correlation values need to be computed for 200 values of k (m=100). In the following discussion, the number of values of k is reduced so that usually only three cross-correlation values are needed. To reduce processing time, an expected differential propagation time may be used to determine an assumed initial discrete time shift k' where corr(k') is expected to be the maximum. Then, corr(k) can be computed on either side of k' until the actual maximum corr(k) is determined. The expected differential propagation time may be zero (that is, the initial value of k' may assume zero flow). This is discussed in more detail below. Alternatively, the expected differential propagation time may be the differential propagation time from an immediately previous measurement of differential propagation time. For a slowly changing fluid velocity the immediately previous measurement may substantially reduce the number of cross-correlation values need to find the maximum. Alternatively, a contemporary measurement (same measurement period) performed by subtracting measurements of the two individual propagation times $(t_{12}, t_{21})$ may be used. Using a contemporary differential propagation time measurement to obtain the expected differential propagation time may be especially useful when measuring flow rate of a gas, which can experience a rapid change.

Figure 2:
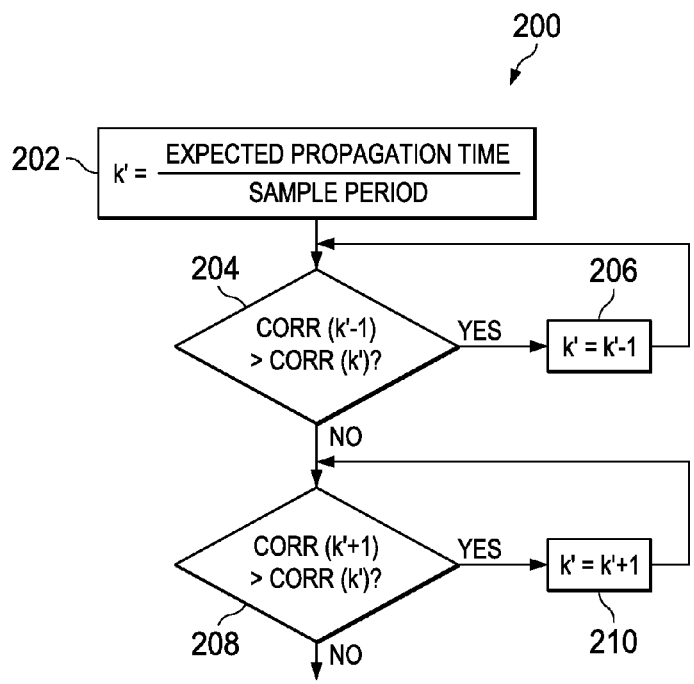
FIG. 2 is a flow chart illustrating an example embodiment of a method for determining the maximum value in a discrete cross-correlation.

FIG. 2 illustrates a method 200 of finding the maximum cross-correlation value given an expected differential propagation time. At step 202, an initial value k' is computed by dividing the expected differential propagation time by the sample period. At step 204, if corr(k'-1) is greater than corr(k') then at step 206 k' is replaced by k'-1 and step 204 is repeated. At step 208, if corr(k'+1) is greater than corr(k') then at step 210 k' is replaced by k'+1 and step 208 is repeated. The process ends with corr(k') being the maximum cross-correlation value.

The resolution of the discrete cross-correlation may be insufficient to provide the accuracy needed for the differential propagation time. The actual differential propagation time may be between two discrete sample times. Interpolation can provide an improved estimate. The shape of the cross-correlation function through the peak is approximately a cosine curve or a parabola. Accordingly, a cosine function or a parabolic function may be used for interpolation through three samples: the sample immediately before the maximum sample, the maximum sample, and the sample immediately after the maximum sample. The following equations are for cosine interpolation, where δ is the delta time to the interpolated peak before or after sample k' (that is, δ may be positive or negative):

$$Z_{-1} = \text{corr}(k' - 1)$$

$$Z_0 = \text{corr}(k')$$

$$Z_1 = \text{corr}(k' + 1)$$

$$\omega = \cos^{-1}\left(\frac{Z_{-1} + Z_1}{2 * Z_0}\right)$$

$$\phi = \tan^{-1}\left(\frac{Z_{-1} - Z_1}{2 * Z_0 * \sin(\omega)}\right)$$

$$\delta = \frac{-\phi}{\omega}$$

The following equation is for parabolic interpolation, where δ is the delta time to the interpolated peak before or after sample k' (that is, δ may be positive or negative):

$$\delta = \frac{Z_{-1} - Z_1}{2(Z_{-1} - 2 * Z_0 + Z_1)}$$

The improved estimated differential propagation time is the time at the maximum value of the cosine interpolation curve. The improved estimate of differential propagation time is as follows:

$$t_{21} - t_{12} \sim (\text{sample period}) * k' + \delta$$

Figure 3:
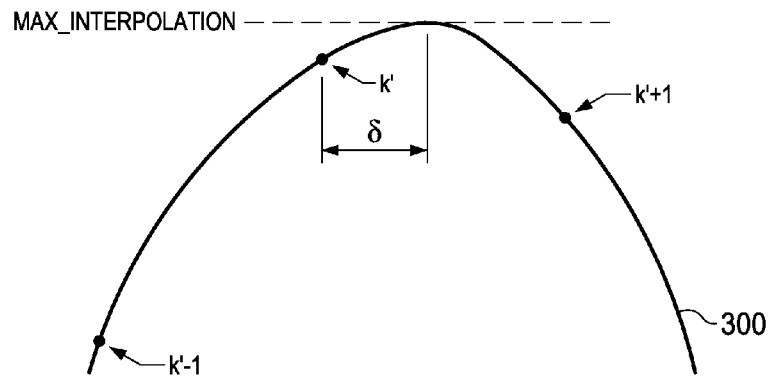
FIG. 3 is a graph illustrating an example embodiment of interpolation between discrete cross-correlation values.

FIG. 3 illustrates a cosine or parabolic curve 300 fitting through three cross-correlation values measured at k'-1, k', and k'+1. In the example of FIG. 3, the estimated differential propagation time (the time at the maximum of the interpolated curve 300) lies between cross-correlation value corr(k') and cross-correlation value corr(k'+1). In the example of FIG. 3, δ is positive.

Consider a specific numerical example. Assume a sampling frequency of 4.0 MHz for a 1.0 MHz transducer. Further assume a pipe that is 1.6 cm diameter, a transducer spacing of 9.1 cm, a fluid velocity of 1.2 m/s, and a velocity of sound in the fluid of 1,480 m/s. The flow rate for this scenario is about 16 liters per minute. The individual propagation times are about 60 microseconds, and the differential propagation time is about 100 nanoseconds. With a sampling frequency of 4 MHz, the sample spacing is 250 nanoseconds. Accordingly, for the example values given, the differential propagation time is less than the sample spacing. For the example values, a value of k=0 corresponds to the maximum value of the discrete cross-correlation for flow rates from zero to more than 16 liters per minute. That is, for the example values given, the appropriate estimate of differential propagation time using discrete cross-correlation is zero and the appropriate initial value for k is zero. The required accuracy for differential propagation time is provided by interpolation. For higher flow rates, for example flow rates beyond 20 liters per minute, the differential propagation time becomes longer than 125 nanoseconds and the correlation technique will have a maximum that is one sample time away from the real maximum. Then, the method of FIG. 2 will shift k by one sample time period. Similarly, for flow rates beyond 40 liters per minute, then the method of FIG. 2 will shift k by two sample periods. That is, the method of FIG. 2 extends the range over which the flow measurement can be performed. Without the method of FIG. 2, with k always equal to zero, the flow rate limit would be about 16 liters per minute but with the method of FIG. 2 the range is extended beyond 40 liters per minute. With 100 samples of each received signal, cross-correlation computations with all possible values of k would require 200 cross-correlation values. For a range of low flow rates the method of FIG. 2 will result in k being unchanged and for higher flow rates the method of FIG. 2 will shift k by one or two discrete values. Typically, no more than five cross-correlation values will be needed to determine the three cross-correlation values that are interpolated. Therefore the controller only needs to compute three to five cross-correlation values instead of many hundreds of cross-correlation values.

The individual propagation times ($t_{12}$, $t_{21}$) may be measured with suitable accuracy by any one of a variety of techniques. For example, the transmitted signal and the received signal may be cross-correlated. In some systems, the transmitted signal is periodic, for example a burst of pulses. In contrast, in the system described below, to minimize power a single pulse is sent to a transmitting ultrasonic transducer, which rings at a resonant frequency (see FIG. 8A). This transmitted ringing signal is not digitized.

Given digitized received signals as discussed above, a controller may measure the time from when an ultrasonic signal is transmitted until a received signal exceeds a predetermined threshold. Note that waiting for the received signal to exceed a threshold means that the received signal may have gone through N resonant cycle times before crossing the threshold. N may be known a priori from a previous calibration, and the quantity N*(resonant cycle time) may be subtracted from the measured propagation time.

However, the received signal may be noisy, causing some timing inaccuracy. In addition, a signal-level threshold is sensitive to signal amplitude changes due to, for example, turbulence, air bubbles, transducer aging, a partially full pipe, etc. Timing accuracy may be improved by measuring the peak of the digitized received signal and using the peak to adjust the threshold or to adjust an amplifier gain, or both. Note that the gain and/or threshold is adjusted after an ultrasonic signal is received, and is adjusted before receiving the next ultrasonic signal. Alternatively, the noise level may be measured between measurements of expected ultrasonic signals and noise level may be used to adjust the gain and/or threshold. In addition, multiple measurements may be averaged to reduce measurement error. The number of measurements being averaged may be varied based on the noise level.

Figure 4:
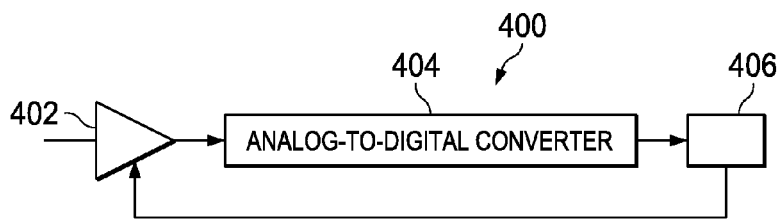
FIG. 4 is a block diagram illustrating an example system for measuring individual propagation times and a differential propagation time.

FIG. 4 illustrates an example embodiment of a system 400 for quantizing received waveforms, computation of cross-correlation for differential propagation time, and timing of digitizing received signals to determine individual propagation times. In FIG. 4, an amplifier 402 receives a signal from an ultrasonic transducer (not illustrated in FIG. 4). An analog-to-digital converter (ADC) 404 quantizes the amplified received signal. A controller 406 initiates the transmitted signals and processes the digitized received signals. The controller 406 may include a microprocessor, a microcontroller, Very Large Scale Integrated (VLSI) circuits or other circuitry suitable for signal processing. The controller 406 may cross-correlate two digitized received signals to determine differential propagation time as discussed above. The controller 406 may also determine the time from when an ultrasonic signal is transmitted until a digitized received signal exceeds a digital threshold. The controller 406 may also determine a peak value of a received signal and use that peak value to modify a gain of the amplifier 402, and/or the digital threshold. Alternatively, the noise level may be measured between measurements of expected ultrasonic signals and noise level may be used to adjust the gain and/or threshold.

Alternatively, for a digitized received signal, a digital filter may be used to determine the envelope of the received signal. The slope of the leading edge of an envelope, or the starting point of an envelope, may be used to determine a starting point of the received signal. Known techniques for determining the envelope of a received signal include the Hilbert Transform method and Kalman filtering.

Figure 5:
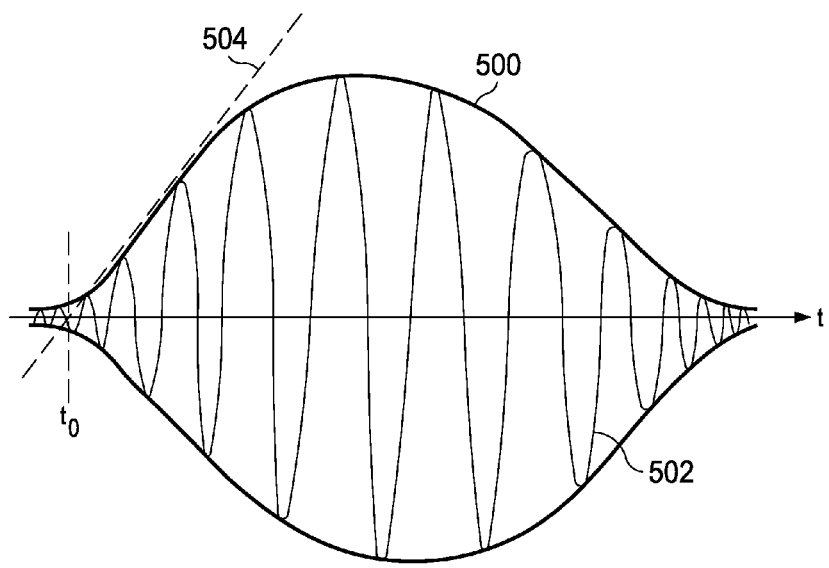
FIG. 5 is a graph illustrating an envelope of a received waveform where the envelope is used to determine a starting time of the received waveform.

FIG. 5 illustrates an envelope 500 of a received signal 502. The envelope may be used to determine a starting time of the received signal. First, the envelope 500 is determined from the quantized received signal. For the Hilbert Transform method, the slope 504 of the leading edge of the envelope 500 is determined. The time $t_0$ at which the slope 504 intersects the time line is used to estimate the time that the received signal is first received. Alternatively, for Kalman filtering, the beginning of the envelope may be well characterized so that the beginning of the envelope may be used instead of the slope of the leading edge.

Alternatively, propagation time may be measured using an analog received signal instead of using a digitized received signal. A digital timer, called a time-to-digital-converter (TDC) (also known as a digital stopwatch) may be used. As discussed above for digital timing of digitized signals, a TDC may measure a time from when the transmitted signal is sent until a received analog signal exceeds a predetermined analog threshold. As discussed above for digitized signals, the received analog signal may be noisy, causing some timing inaccuracy, and timing accuracy may be improved by measuring the peak of a digitized received signal and using the peak of the digitized received signal to adjust the analog threshold and/or to adjust an amplifier gain for a TDC circuit. Alternatively, the noise level may be measured between measurements of expected ultrasonic signals and noise level may be used to adjust the gain and/or threshold.

Figure 6:
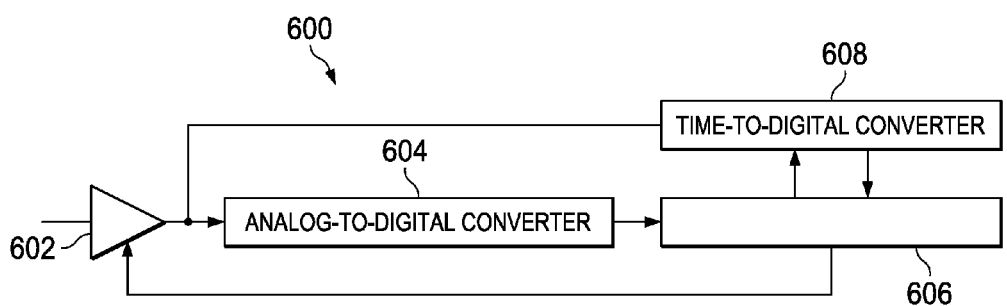
FIG. 6 is a block diagram illustrating an alternative example system for measuring individual propagation times and a differential propagation time.

FIG. 6 illustrates an example embodiment of a system 600 for digitizing received waveforms, computation of cross-correlation for differential propagation time, and analog timing of received signals to determine individual propagation times. In FIG. 6, an amplifier 602 receives a signal from an ultrasonic transducer (not illustrated in FIG. 6). An analog-to-digital converter (ADC) 604 digitizes the amplified received signal. A controller 606 initiates the transmitted signals and processes the digitized received signals. The controller 606 may include a microprocessor, a microcontroller, Very Large Scale Integrated (VLSI) circuits or other circuitry suitable for signal processing. The controller 606 may cross-correlate two digitized received signals to determine a differential propagation time as discussed above. In the example of FIG. 6, a time-to-digital converter (TDC) 608 measures the time from when a transmitted signal is initiated until an analog received signal exceeds a predetermined analog threshold. The controller 606 may also determine a peak value of a digitized received signal and use that peak value to modify a gain of the amplifier 602, and/or the analog threshold in the TDC 608. Alternatively, the noise level may be measured between measurements of expected ultrasonic signals and noise level may be used to adjust the gain and/or threshold.

Figure 7:
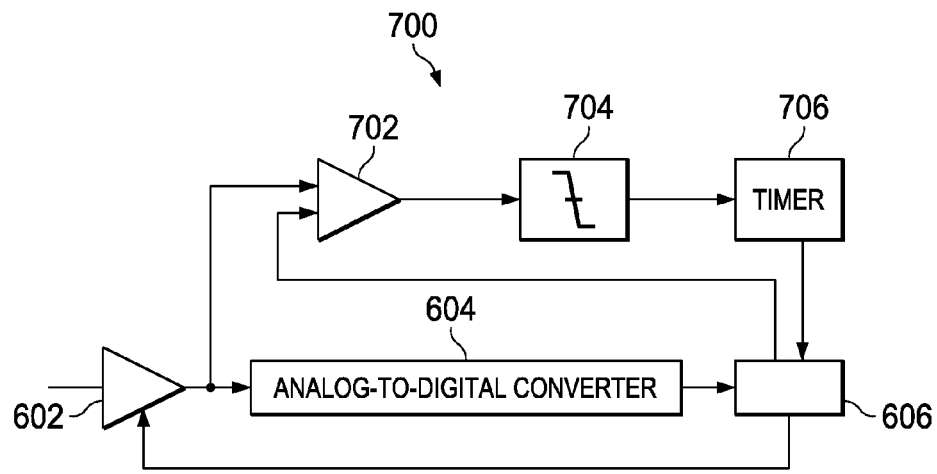
FIG. 7 is a block diagram illustrating an alternative example system for measuring individual propagation times and a differential propagation time.

FIG. 7 illustrates an alternative example embodiment. In FIG. 7, an amplifier 602, an ADC 604, and a controller 606 are as in FIG. 6. In FIG. 7, the TDC is implemented as a comparator 702, a zero-crossing detector 704, and a timer 706. In the example of FIG. 7, when the received signal exceeds the threshold the comparator 702 enables the zero crossing detector 704. When the received signal next crosses zero, the zero crossing detector 704 stops the timer 706.

Figure 8A:
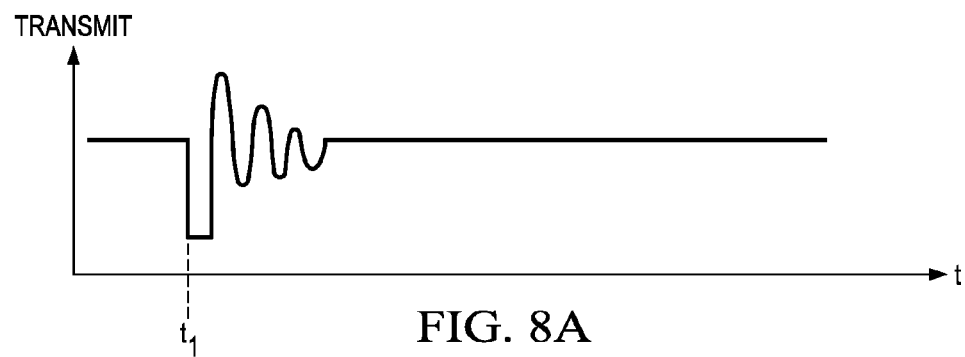
FIG. 8A is a time chart illustrating an example transmitted ultrasonic waveform for the system of FIG. 7.
Figure 8B:
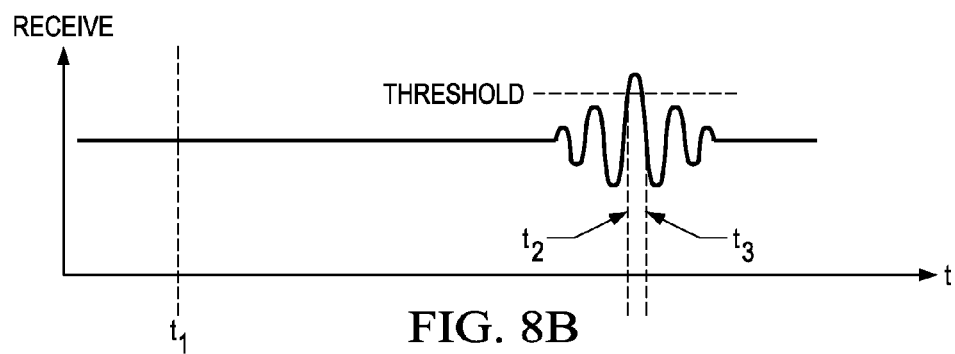
FIG. 8B is a time chart illustrating an example received ultrasonic waveform for the system of FIG. 7.

FIGS. 8A and 8B illustrate the transmitted and received pressure waveforms. In FIG. 8A, at time $t_1$, the transmitter electronics send a pulse to a transmitting ultrasonic transducer, which rings at a resonant frequency. In FIG. 8B, a receiving ultrasonic transducer generates a voltage in response to the received pressure waveform. At time $t_2$ the amplified received voltage exceeds the threshold and the comparator 702 enables the zero crossing detector 704. At time $t_3$ the zero crossing detector 704 detects that the amplified received voltage crosses zero, and the zero crossing detector 704 stops the timer 706. Note that waiting for the received waveform to exceed a threshold means that the received waveform has crossed zero N resonant cycle times before $t_3$ so the propagation time is $t_3$ minus N*(resonant cycle time). N is known a priori, and the quantity N*(resonant cycle time) may be subtracted from $t_3$ (the time determined by the timer 706). Alternatively, the timer 706 may be started at a negative time corresponding to N*(resonant cycle time) so that the timer represents the actual propagation time.

As discussed above, an expected differential propagation time may be used to reduce the computation required to find the peak of the cross-correlation. If a TDC circuit is used to measure the individual propagation times ($t_{12}$, $t_{21}$), then $t_{21}$ as measured by the TDC circuit may be subtracted from $t_{12}$ as measured by the TDC circuit to provide an expected differential propagation time.

Figure 9:
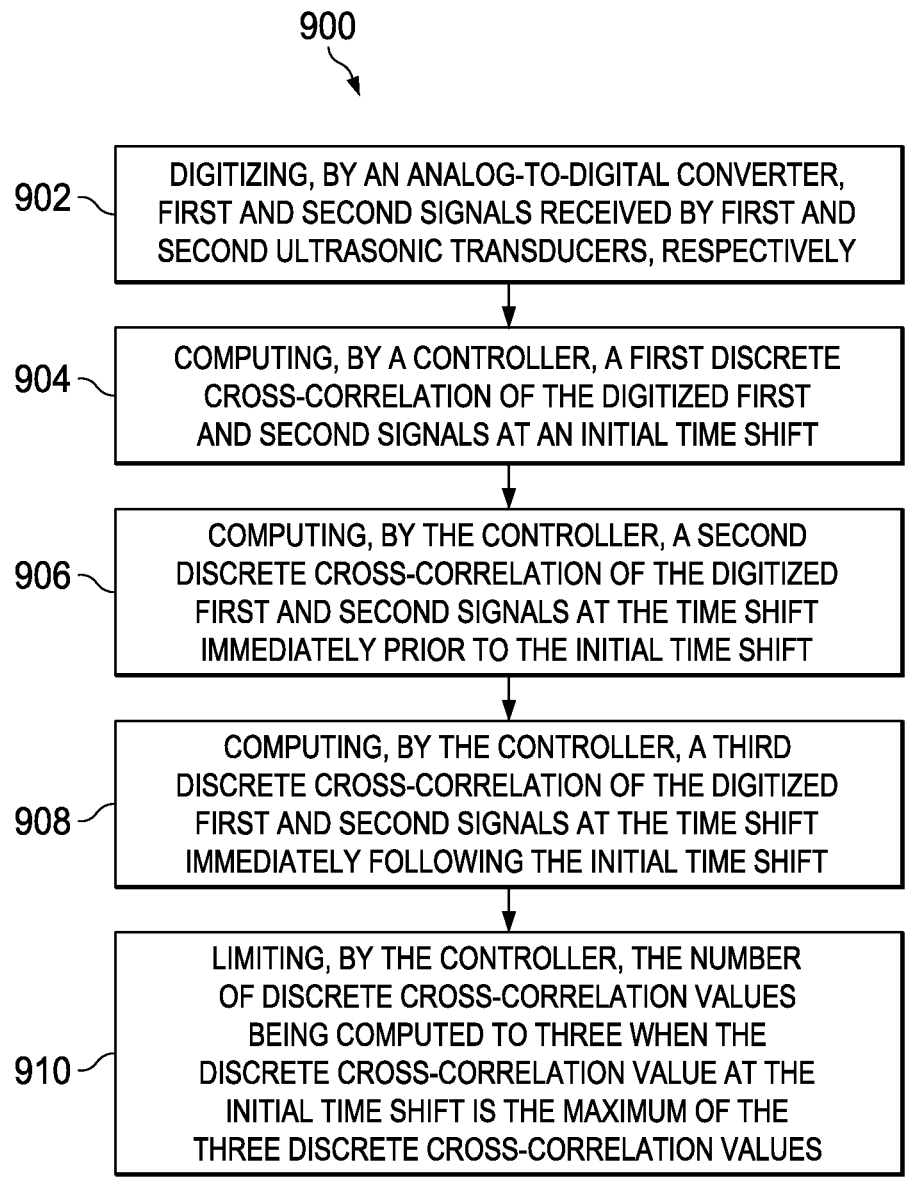
FIG. 9 is a flow chart illustrating an example embodiment of a method.

FIG. 9 illustrates a method 900. At step 902, first and second signals received by first and second ultrasonic transducers, respectively, are digitized by an analog-to-digital converter. At step 904, a controller computes a first discrete cross-correlation of the digitized first and second signals at an initial time shift. At step 906, the controller computes a second discrete cross-correlation of the digitized first and second signals at the time shift immediately prior to the initial time shift. At step 908, the controller computes a third discrete cross-correlation of the digitized first and second signals at the time shift immediately following the initial time shift. At step 910, the controller limits the number of discrete cross-correlation values being computed to three when the discrete cross-correlation value at the initial time shift is the maximum of the three discrete cross-correlation values.

Note that the arrangement of the steps in the flow charts of FIGS. 2 and 9 does not necessarily imply a required order of steps and that some steps may occur simultaneously. In particular, in FIG. 2, step 208 may occur before step 204, and in FIG. 9, step 908 may occur before step 906.

While certain specific embodiments of a method and of a flow meter have been expressly disclosed herein, various alternative embodiments thereof will occur to those skilled in the art after reading this disclosure. It is intended that the appended claims be broadly construed to cover such alternative embodiments, except as limited by the prior art.

What is claimed is:

1. A method of measuring velocity of a fluid in a pipe, comprising:
    transmitting an ultrasonic pressure wave from a first transducer at the pipe through the fluid toward a second transducer at the pipe;
    generating a first signal at the second transducer corresponding to the ultrasonic pressure wave as received at the second transducer;
    transmitting an ultrasonic pressure wave from the second transducer through the fluid toward the first transducer;
    generating a second signal at the first transducer corresponding to the ultrasonic pressure wave as received at the first transducer;
    digitizing, by an analog-to-digital converter, the first and second signals; and
    operating a controller to perform a plurality of operations comprising:
        computing a first discrete cross-correlation of the digitized first and second signals at a first time shift of the first signal relative to the second signal;
        computing a second discrete cross-correlation of the digitized first and second signals at a second time shift corresponding to the first time shift advanced by an increment in a first direction;
        computing a third discrete cross-correlation of the digitized first and second signals at a third time shift corresponding to the first time shift advanced by an increment in a second direction;
        comparing the first and second cross-correlations;
        responsive to the first cross-correlation being greater than the second cross-correlation, comparing the first and third cross-correlations;
        responsive to the first cross-correlation being greater than the third cross-correlation, interpolating over the first, second, and third cross-correlations to identify a differential propagation time; and
        calculating the velocity of the fluid from the differential propagation time.

2. The method of claim 1, wherein the plurality of operations further comprise:
    determining an expected differential propagation time; and
    selecting the first time shift responsive to the expected differential propagation time.

3. The method of claim 2, wherein the expected differential propagation time corresponds to zero sample periods of the analog-to-digital converter.

4. The method of claim 2, where the expected differential propagation time is a previously measured differential propagation time.

5. The method of claim 1, wherein the interpolating step comprises:
    computing, an interpolation curve through the first, second, and third cross-correlations; and
    using a peak of the interpolation curve to determine an actual differential propagation time.

6. The method claim 5, where the interpolation curve is a cosine curve.

7. The method of claim 5, where the interpolation curve is a parabola.

8. A flow meter comprising: first and second ultrasonic transducers;

wherein the first ultrasonic transducer transmits a first ultrasonic pressure wave from the first ultrasonic transducer at a pipe through a fluid toward the second ultrasonic transducer at the pipe;

wherein the second ultrasonic transducer generates a first signal at the second ultrasonic transducer corresponding to the first ultrasonic pressure wave as received at the second ultrasonic transducer;

wherein the second ultrasonic transducer transmits a second ultrasonic pressure wave from the second ultrasonic transducer through the fluid toward the first ultrasonic transducer;

wherein the first ultrasonic transducer generates a second signal at the first ultrasonic transducer corresponding to the second ultrasonic pressure wave as received at the first ultrasonic transducer;

analog-to-digital converter circuitry, coupled to receive and digitize analog signals from the first and second ultrasonic transducers;

a programmable controller, coupled to the analog-to-digital converter circuitry, programmed to measure a velocity of a fluid from the digitized analog signals from the ultrasonic transducers by:

computing a first discrete cross-correlation of the digitized signals at a first time shift of the digitized signal from the first ultrasonic transducer relative to the digitized signal from the second ultrasonic transducer;

computing a second discrete cross-correlation of the digitized signals at a second time shift corresponding to the first time shift advanced by an increment in a first direction;

computing a third discrete cross-correlation of the digitized signals at a third time shift corresponding to the first time shift advanced by an increment in a second direction;

comparing the first and second cross-correlations;

responsive to the first cross-correlation being greater than the second cross-correlation, comparing the first and third cross-correlations;

responsive to the first cross-correlation being greater than the third cross-correlation, interpolating over the first, second, and third cross-correlations to identify a differential propagation time;

interpolating over the first, second, and third cross-correlations to identify a differential propagation time; and calculating the velocity of the fluid from the differential propagation time.

9. The flow meter of claim 8, further comprising:

an amplifier for amplifying the signal from the first ultrasonic transducer by a gain, and for applying the amplified signal to the analog-to-digital converter circuitry;

wherein the controller is further programmed to determine a peak of the digitized signal from the first ultrasonic transducer and to adjust the gain of the amplifier based on the peak.

10. The flow meter of claim 8, wherein the controller is further programmed to determine a first propagation time of an ultrasonic signal from the first ultrasonic transducer to the second ultrasonic transducer by measuring a time from when a signal is transmitted by the first ultrasonic transducer until the digitized signal from the second ultrasonic transducer exceeds a predetermined threshold.

11. The flow meter of claim 10, further comprising:

an amplifier for amplifying the signal from the second ultrasonic transducer by a gain, and for applying the amplified signal to the analog-to-digital converter circuitry;

wherein the controller is further programmed to determine a peak of the digitized signal from the second ultrasonic transducer and to adjust the predetermined threshold based on the measured peak.

12. The flow meter of claim 10, wherein the controller is further programmed to determine a time at which the digitized signal from the second ultrasonic transducer crosses zero after exceeding the predetermined threshold.

13. The flow meter of claim 10, further comprising:

a time-to-digital converter comprising:

a comparator, having an input receiving the amplified signal from the amplifier, and an input receiving a threshold level from the controller;

a zero crossing detector coupled to an output of the comparator; and a timer, coupled to an output of the zero crossing detector, for measuring a time at which the amplified signal crosses the threshold level.

14. The flow meter of claim 8, wherein the controller is further programmed to determine a first propagation time of an ultrasonic signal from the first ultrasonic transducer to the second ultrasonic transducer by determining a beginning of an envelope of the digitized signal from the second ultrasonic transducer.

15. The method of claim 1, wherein the plurality of operations further comprise:

responsive to the first cross-correlation being less than the second cross-correlation:

computing a fourth discrete cross-correlation at a fourth time shift corresponding to the second time shift advanced by the increment in the first direction;

comparing the second and fourth cross-correlations; and responsive to the second cross-correlation being greater than the fourth cross-correlation, interpolating over the first, second, and fourth cross-correlations to identify the differential propagation time.

16. The flow meter of claim 8, wherein the programmable controller is programmed to measure the velocity further by:

responsive to the first cross-correlation being less than the second cross-correlation:

computing a fourth discrete cross-correlation at a fourth time shift corresponding to the second time shift advanced by the increment in the first direction;

comparing the second and fourth cross-correlations; and responsive to the second cross-correlation being greater than the fourth cross-correlation, interpolating over the first, second, and fourth cross-correlations to identify the differential propagation time.

* * * * *